(12) United States Patent
Aweva et al.

(10) Patent No.: US 6,894,974 B1
(45) Date of Patent: May 17, 2005

(54) METHOD, APPARATUS, MEDIA, AND SIGNALS FOR CONTROLLING PACKET TRANSMISSION RATE FROM A PACKET SOURCE

(75) Inventors: James Aweva, Nepean (CA); Michel Ouellette, Rockland (CA); Delfin Y. Montuno, Kanata (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/566,391

(22) Filed: May 8, 2000

(51) Int. Cl.[7] ................................................. H04J 3/14
(52) U.S. Cl. ..................... 370/230.1; 370/231; 370/232; 370/235.1; 370/237; 370/412
(58) Field of Search ............................... 370/230.1, 231, 370/232, 235.1, 237, 412, 216, 229, 233, 234, 235.5, 410, 235

(56) References Cited

U.S. PATENT DOCUMENTS

| | | | | |
|---|---|---|---|---|
| 5,541,919 A | * | 7/1996 | Yong et al. | 370/416 |
| 6,215,769 B1 | * | 4/2001 | Ghani et al. | 370/230 |
| 6,252,851 B1 | * | 6/2001 | Siu et al. | 370/236 |
| 6,424,626 B1 | * | 7/2002 | Kidambi et al. | 370/236 |
| 6,529,477 B1 | * | 3/2003 | Toporek et al. | 370/235 |
| 6,671,258 B1 | * | 12/2003 | Bonneau | 370/235 |

OTHER PUBLICATIONS

C. Partridge, "ACK Spacing for High Delay–Bandwidth Paths with insufficient Buffering", IETF Internet Draft, Sep., 1998.
Paolo Narvaez and Kai–Yeung Siu, "Acknowledgement bucket scheme for regulating TCP flow over ATM", Computer Networks and ISDN Systems, IEEE Globecom '97, Phoenix, Arizona, Nov. 1997 pp. 1775–1791.
Paolo Narvaez and Kai–Yeung Siu, "An Acknowledgement Bucket Scheme for Regulating TCP Flow over ATM", IEEE Globecom '97, Phoenix, Arizona, Nov. 1997.
Jian Ma, "Improving TCP Performance in IP networks with Wireless links", IEEE, ICPWC '99 , Jaipur, India pp. 211–215.
Arata Koike, "TCP flow control with ACR information", ATM Forum Contribution 97–0758R1, Nov., 1997.
"Traffic Management Specification Version 4.0", ATM Forum, Apr. 1996.
Van Jacobson and Michael J. Karels, "Congestion Avoidance and Control", Proc. ACM SIGCOMM '88, Nov., 1988 pp. 314–329.
W. Stevens, "TCP Slow Start, Congestion Avoidance, Fast Retransmit, and Fast Recovery Algorithms", IETF RFC 2001, Jan., 1997.
Phil Karn, "dropping TCP acks", Mail to the end–to–end mailing list, Feb., 1996.
Sally Floyd and Van Jacobson, "Random Early Detection Gateways for Congestion Avoidance", IEEE/ACM Transactions on Networking, 1:4, Aug. 1993 pp. 397–413.
Nasir Ghani, "Enhanced TCP/IP ACK Pacing for High Speed Networks", Proc. 16th Int'l Teletraffic Congress, Edinburgh, Scotland, Jun., 1999.
K. Aström and T. Hägglund, "PID Controllers: Theory, Design and Tuning", Instrument Society of America, 1995, pp. v. 80–81.

* cited by examiner

Primary Examiner—Seema S. Rao
Assistant Examiner—Inder Pal Mehra

(57) ABSTRACT

A method, apparatus, computer readable media and signal embodied in a carrier wave for controlling the rate at which data packets are transmitted from a source responsive to acknowledgement signals in a packet network involves adjusting an acknowledgement rate at which acknowledgement signals are sent to the source, in response to the difference between target queue occupancy and measured queue occupancy of a queue buffer in which data packets from the source are received.

21 Claims, 9 Drawing Sheets

METHOD, APPARATUS, MEDIA, AND SIGNALS FOR CONTROLLING PACKET TRANSMISSION RATE FROM A PACKET SOURCE

BACKGROUND OF THE INVENTION

1. Field of the Invention

The present invention relates to packet network communications, and more particularly to method, apparatus, media, and signals for controlling a packet transmission rate from a packet source to reduce queue congestion.

2. Description of Related Art

The rapid growth of applications and services over the Internet has made the performance of the Transmission Control Protocol (TCP) a major issue in data networking. TCP is an end-to-end transport protocol that is designed to work with any underlying network technology. The TCP protocol makes no assumption on how the network processes data it sends, and has its own data recovery and flow control features. The basic TCP does not rely on any explicit feedback from the network to detect congestion. Instead, it relies on packet loss as the only means of signaling network congestion. Every time a TCP data source detects a packet loss, it assumes that the loss is due to buffer overflow somewhere in the network. The source then reduces its data transmission rate to alleviate the congestion that could have caused the packet loss.

Specifically, congestion control and error recovery are implemented by a dynamic window in TCP. The source expects to receive an acknowledgment from the destination for every packet it transmits. The size of the dynamic window determines the number of unacknowledged packets that can be present in the network at any given time. When a packet is acknowledged, the window size is increased (up to a certain maximum), and when a packet is lost, the window size is decreased, forcing the source data rate to decrease.

In a high-latency network environment, the dynamic window flow control mechanism of TCP may not be very effective because it relies on packet loss to signal congestion, instead of avoiding congestion and buffer overflow. Furthermore most implementations use coarse timers, with 200–500 ms granularity, for example, which results in delayed response. In general, by the time the source starts decreasing its data rate because of packet loss, the network has already been overly congested. Ideally, it would be desirable for the source to react to congestion before it occurs rather than acting when it is too late.

By incorporating efficient and faster congestion indication mechanisms in the end-to-end TCP feedback control loop, the performance of TCP can be improved significantly. Providing such mechanisms by modifying or changing the senders or receiver's TCP stack is an option. However, this may not be a feasible solution in the near term since the large installed base of TCP end-user implementations have to be modified or changed. In addition, only upgraded end-users get the performance improvements. What is needed are solutions which ensure compatibility with current TCP end-user implementations, expedite market acceptance, and meet current data networking requirements.

A number of mechanisms have been proposed to use a network node as a possible place to detect congestion and take the necessary control decisions to limit the impact of congestion on network performance with these requirements in mind. Some mechanisms are based on implicit feedback and only indirectly influence TCP behavior, e.g., Random Early Detection (RED) which relies on packet dropping for congestion control.

ACK pacing is a more direct technique for regulating the TCP source rate by controlling the rate of arrival of acknowledgments to the TCP source. ACK pacing is analogous to the storage of permits in the well-known leaky-bucket scheme. In this scheme TCP acknowledgments can be viewed as permits that allow the destination (and also a network element through a slower pacing interval) to request packets from the source. The ACKs arrive at the network node according to TCP dynamics and are drained out at a configured rate. ACK pacing at a network node eliminates the need to change or modify the sender or receiver's TCP stack.

Studies have shown that by appropriately regulating the inter-ACK spacing, an intermediate network node can essentially reduce queue buildups and buffer requirements, TCP timeouts and packet loss while still achieving high link utilization. A number of algorithms have been proposed for determining the proper ACK spacing in network nodes. Some of these algorithms include techniques to infer when a TCP connection is in slow-start versus congestion avoidance, so that the desired spacing between ACKs can be adjusted accordingly to provide more spacing in the slow-start phase, for example. Most of the existing ACK pacing algorithms do not offer optimal behavior because it is difficult to design an algorithm that can determine the proper ACK spacing for a wide range of network conditions. In addition, it will be very difficult, if not impossible, to infer at a network node the (slow-start or congestion avoidance) phases of the aggregate TCP traffic mix.

SUMMARY OF THE INVENTION

The present invention addresses the above need by providing a method of controlling the rate at which data packets are transmitted from a source responsive to acknowledgement signals in a packet network. In a broad sense the method comprises adjusting an acknowledgement rate at which acknowledgement signals are sent to the source, in response to the difference between target queue occupancy and measured queue occupancy of a queue buffer in which data packets from the source are received.

Adjusting the acknowledgement rate may be done such that the difference between the target queue occupancy and the measured queue occupancy is minimized.

The method may involve producing a difference value representing the difference between the target queue occupancy value and the measured queue occupancy value and filtering successively produced difference values to produce a final difference value.

Filtering may involve producing the difference value as an exponentially weighted moving average of the successively produced difference values.

Preferably the method involves transmitting acknowledgement signals at a rate determined as a function of a present rate and the difference value. This rate value may be produced according to the relation:

$$r(n)=r(n-1)+\alpha e(n)$$

where:

r(n) is the rate value at time interval n;

r(n−1) is a rate value immediately preceding the rate value at time interval n;

α is a control gain value; and e(n) is a difference value representing the difference between the target queue occupancy and the actual queue occupancy.

Preferably, bounds are imposed to limit the acknowledgement rate.

In accordance with another aspect of the invention, there is provided a computer readable medium for providing instructions for directing a processor to carry out a method of controlling the rate at which data packets are transmitted from a source responsive to acknowledgement signals in a packet network, the instructions being operable to direct a processor to adjust an acknowledgement rate at which acknowledgement signals are sent to the source, in response to the difference between target queue occupancy and measured queue occupancy of a queue buffer in which data packets from said source are received.

In accordance with another aspect of the invention, there is provided a signal embodied in a carrier wave having a segment for directing a processor to adjust an acknowledgement rate at which acknowledgement signals are sent to a source, in response to the difference between target queue occupancy and measured queue occupancy of a queue buffer in which data packets from said source are received.

In accordance with another aspect of the invention, there is provided an apparatus for controlling the rate at which data packets are transmitted from a source responsive to acknowledgement signals in a packet network. The apparatus comprises provisions for detecting queue occupancy of a queue buffer in which data packets from the source are received and provisions for adjusting an acknowledgement rate at which acknowledgement signals are sent to the source, in response to the difference between target queue occupancy and measured queue occupancy of a queue buffer in which data packets from said source are received.

In accordance with another aspect of the invention, there is provided an apparatus for controlling the rate at which data packets are transmitted from a source responsive to acknowledgement signals in a packet network. The apparatus comprises a queue monitor for producing signals indicative of queue occupancy of a queue buffer in which data packets from said source are received and an acknowledgement rate control signal generator for generating a rate signal in response to the difference between target queue occupancy and measured queue occupancy of a queue buffer in which data packets from said source are received, for adjusting an acknowledgement rate at which acknowledgement signals are sent to the source.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
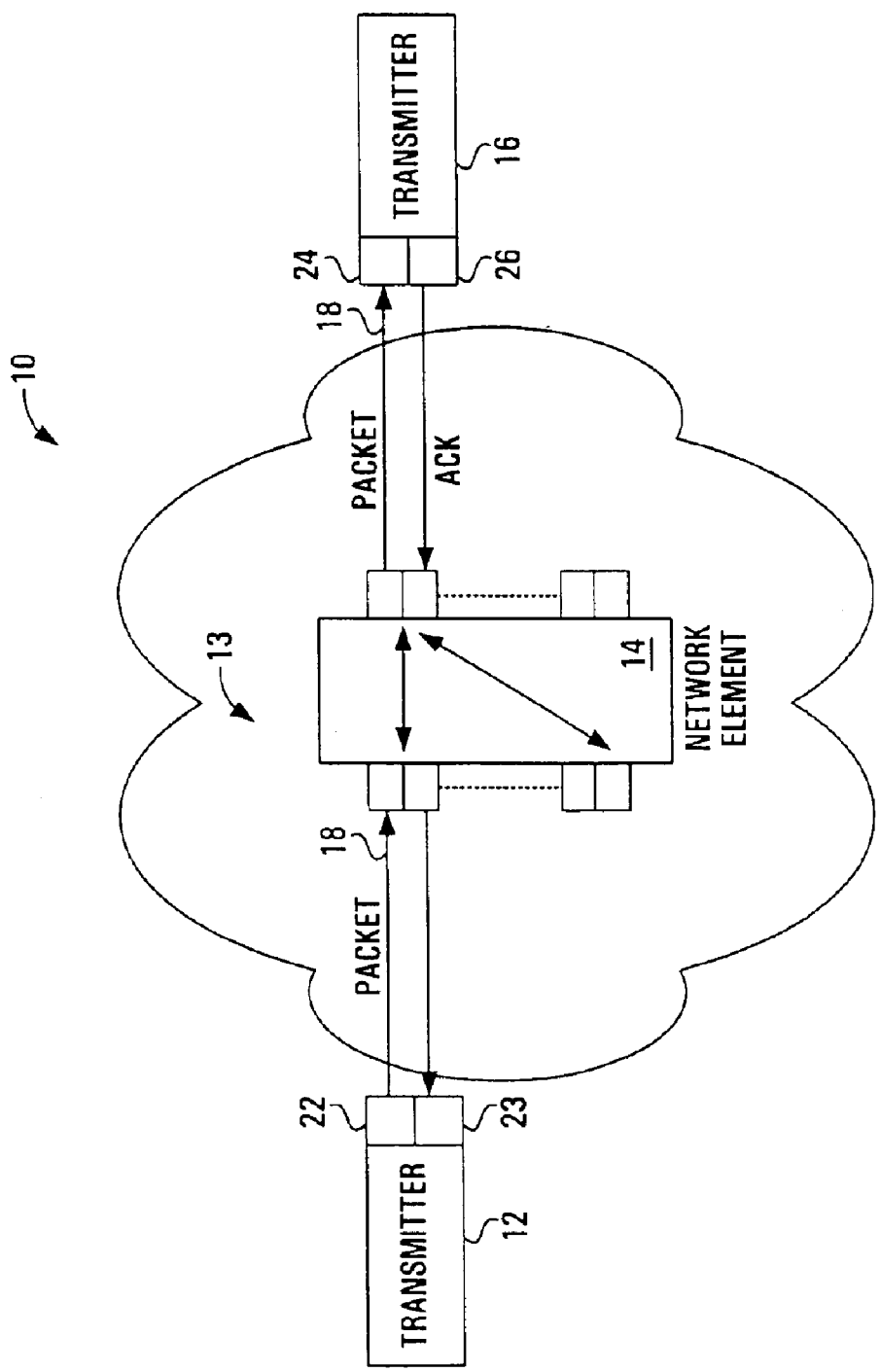
FIG. 1 is a schematic representation of a network employing a network element configured with an apparatus according to a first embodiment of the invention.

As shown generally at 10 in FIG. 1, a packet network according to a first embodiment of the invention includes a first data transmitter 12, a network element 14 and a first data receiver 16. In general, the transmitter 12 transmits data packets in a forward direction to the network element 14, which, in turn, transmits the data packets to the receiver 16. It will be appreciated that there may be a plurality of network elements between a plurality of transmitters and a plurality of receivers, however, for simplicity only one of each is shown.

In this embodiment, the data packets transmitted by the transmitter 12 are transmitted as "forward" data packets 18, which are communicated in a forward direction i.e. from the transmitter 12 to the receiver 16. In this specification, the term "packet" is applied broadly, and contemplates any quantum of data, such as a block, a frame, a datagram, a cell, a word, a byte, or a bit, for example. In general, a transmitter 12-receiver 16 pair that exchanges packets via one or more network elements 14 is called a connection.

The first transmitter 12 may be any device capable of transmitting data packets on a network, for example a telephone, a computer, a terminal, a video camera, an appliance with embedded logic or processor circuitry, or more generally any telecommunication or telephony device. Additionally, the transmitter 12 may include a receiver 23 for receiving data packets from the network 10.

The receiver 16 may be any device capable of receiving data packets from a network, for example a telephone, a computer, a terminal, a video receiver, an appliance with embedded logic or processor circuitry, or more generally any telecommunication or telephony device. The receiver 16 includes a receive buffer 24 for receiving forward data packets 18 for use at the receiver 16. Additionally, the receiver 16 has a transmitter 26 for transmitting data packets on the network 10.

When the receiver 16 receives a forward data packet 18, it engages its transmitter 26 to transmit an acknowledgement signal in the form of an acknowledgement packet, in a reverse direction for receipt by the transmitter 12 via the network element 14 associated with the connection. Generally, an acknowledgement signal is a special reverse data packet transmitted in the reverse direction, i.e. from the receiver 16 to the transmitter 12, and includes a specific pattern of bits that identifies it as an acknowledgement signal.

The transmitter 12 includes a transmission buffer 22 for queuing forward data packets 18 prior to transmission. The number of forward data packets 18 which are transmitted from the transmission buffer 22 in a transmission is determined by a sliding window called a "congestion window" maintained by a processor at the transmitter 12 and operating on the transmission buffer 22. Each time the transmitter 12 receives an acknowledgement packet from the receiver 16, the congestion window advances, permitting the transmitter 12 to transmit a new set of forward data packets 18 onto the network 10. The size of the congestion window determines the number of forward data packets 18 transmitted from the transmitter 12 and the rate at which acknowledgement packets are received determines the rate at which sets of forward data packets are transmitted and hence determines the data packet transmission rate from the transmitter 12.

Figure 2:
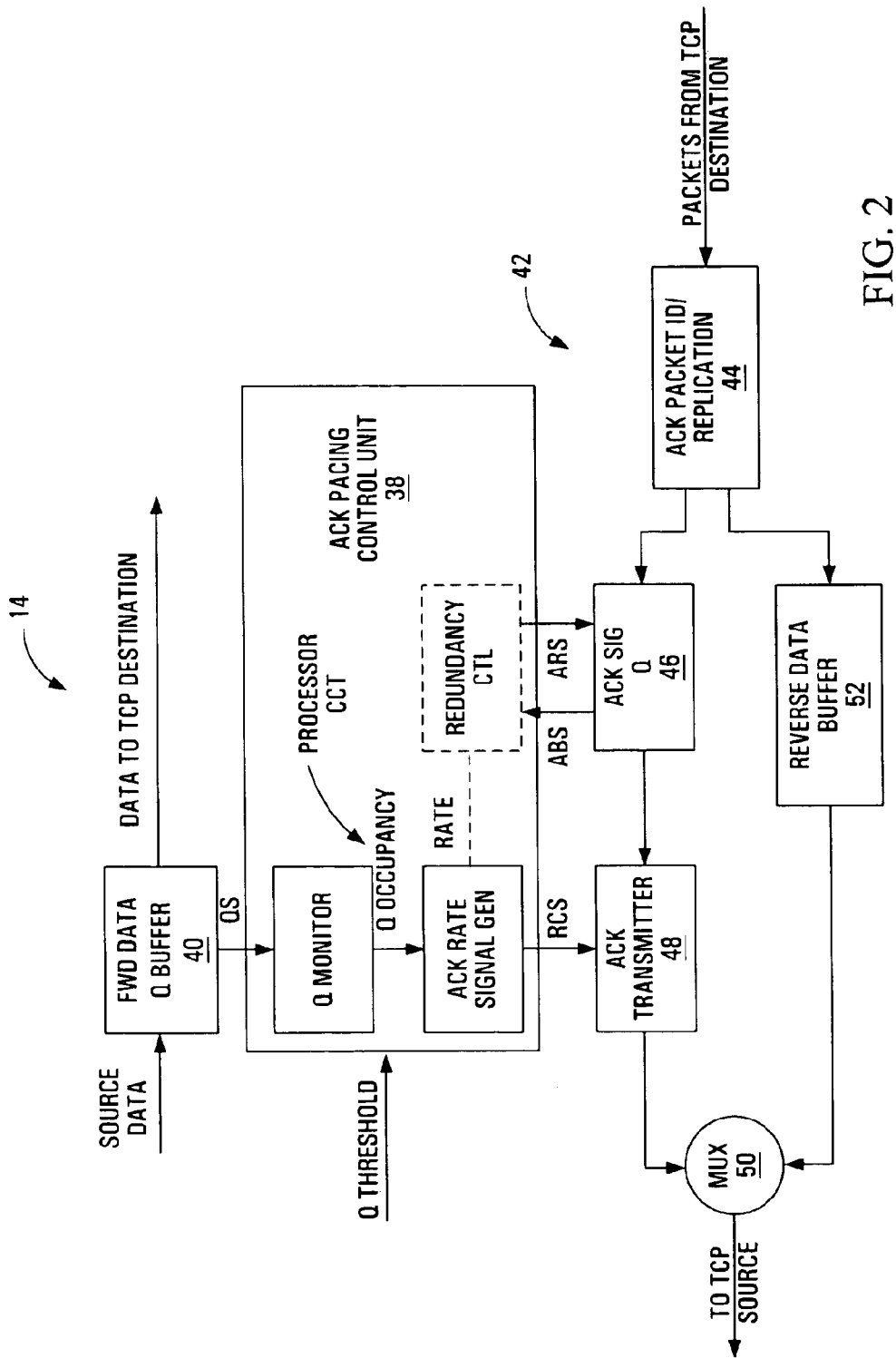
FIG. 2 is a schematic block diagram of the network element and apparatus according to the first embodiment of the invention.

Referring to FIG. 2, a network element 14 according to the first embodiment of the invention is shown in greater detail and includes an apparatus 38 for controlling the rate at which data packets are transmitted from a source which in this embodiment is the transmitter 12. The apparatus works with sources which are responsive to acknowledgement signals transmitted from the receiver 16. To do this, the apparatus 38 is in communication with a forward data queue buffer 40 and an acknowledgement packet processor shown generally at 42, of the network element 14.

Effectively, the apparatus 38 adapts an acknowledgement pacing rate r at which acknowledgement packets are transmitted to the transmitter 12 from the network element 14, in response to the traffic load at the network element by increasing the rate r to make aggressive use of the forward data queue buffer 40 when a measured queue parameter is less than a target value and by decreasing the rate r to reduce the burden on the forward data queue buffer 40 when the measured queue parameter is greater than the target value. The measured queue parameter may be queue occupancy, for example. The goal is to adapt r to react to the traffic dynamics and to keep the queue parameter close to the target value in order to minimize packet losses and TCP timeouts, and improve data throughput.

The forward data queue buffer 40 is a first-in first-out buffer implemented in random access memory (not shown) of the network element 14. A processor (not shown) in the network element 14 defines and maintains input and output pointers defining memory locations at which new forward data packets are to be loaded into the forward data queue buffer 40 and at which forward data packets are to be taken from the forward data queue buffer 40 for transmission to the TCP destination or receiver 16. The forward data queue buffer 40 has a buffer size B representing the number of data packets which can be held in the buffer at any given time. The selection of buffer size depends on buffer dimensioning and traffic engineering and influences packet losses and system utilization level. Typically B is selected to be at least equal to one bandwidth-delay product worth of data.

The acknowledgement signal processor 42 is also part of the network element and in this embodiment, it includes a detector 44 for detecting a conventional data packet or an acknowledgement signal which, in this embodiment, is an acknowledgement data packet, produced by the receiver 16 in response to receipt of a forward data packet from the transmitter 12. On detection of an acknowledgement packet, such packet is forwarded to an acknowledgement signal queue 46 from which an acknowledgement signal transmitter 48 receives packet signals and transmits them through a multiplexer 50 to the first data transmitter 12, in response to a signal representing an acknowledgement token received from the apparatus 38.

If the received packet is a conventional data packet, the detector 44 forwards the packet to a reverse data buffer 52 which provides such packets to the multiplexer 50, also for transmission to the transmitter 12.

Acknowledgement packet identification is required to separate acknowledgement packet flow from normal data traffic. To identify an acknowledgement packet, the detector checks an ACK bit in a packet received from the receiver 16 to see if the bit is set. It is also possible that acknowledgement information might be carried (piggybacked) in a data packet traveling in the reverse direction. Acknowledgement information can be separated from the data packet by first clearing the ACK bit in the data packet and then a new ACK packet can be generated and stored in the acknowledgement signal queue 46, with acknowledgement information copied from the data packet.

In one sense, the apparatus 38 monitors the forward data queue buffer 40 and determines when to send an acknowledgement token signal to the acknowledgement signal transmitter 48 to cause an acknowledgement packet to be transmitted from the network element 14 in response to forward data queue occupancy at the forward data queue buffer 40 of the network element 14.

Figure 3:
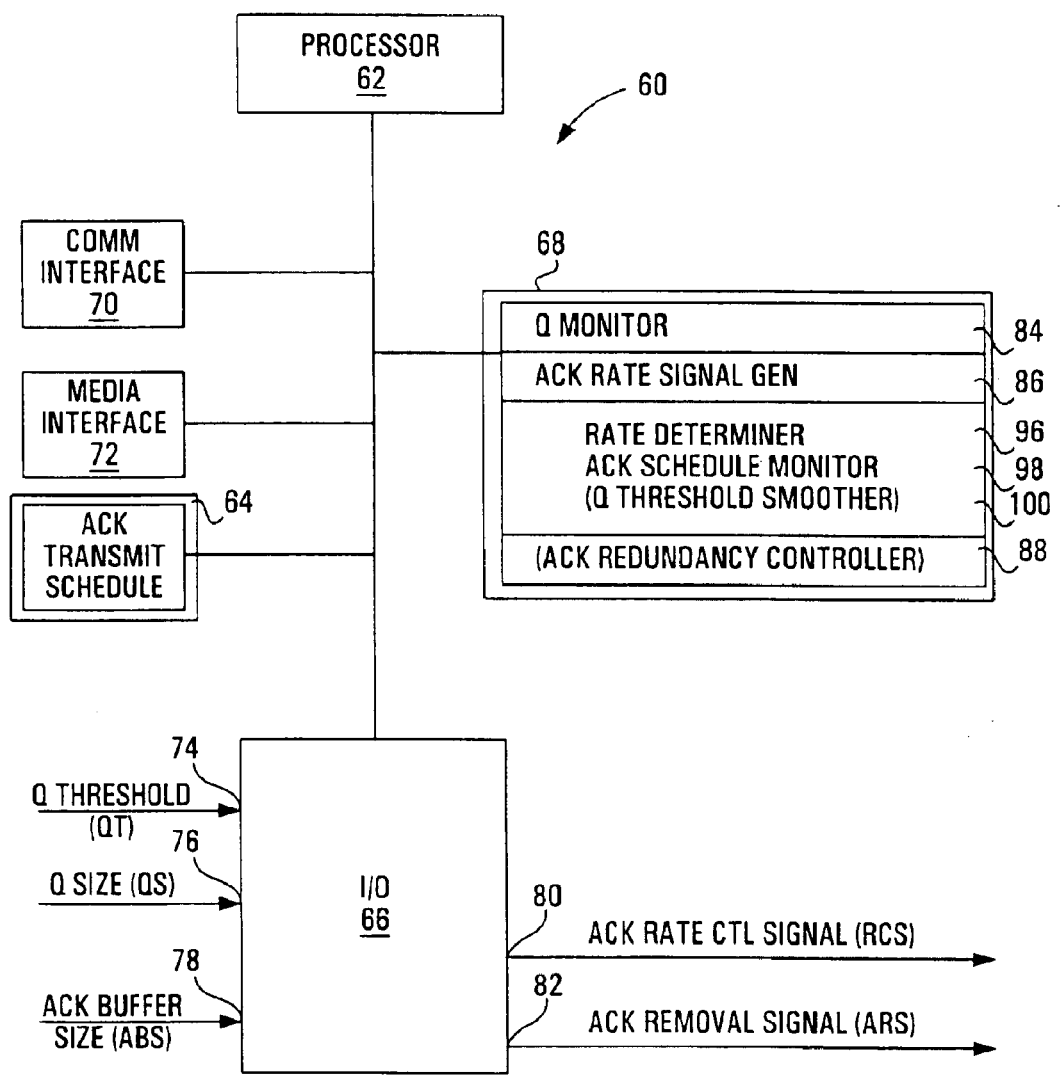
FIG. 3 is a block diagram of the apparatus according to the first embodiment of the invention.

Referring to FIG. 3, to do this the apparatus 38 comprises a processor circuit shown generally at 60. In this embodiment, the processor circuit 60 comprises a processor 62 in communication with random access memory (RAM) 64, an input/output 110 interface 66, and program memory 68. Optionally and preferably, the processor circuit 60 further comprises a communications interface 70 and a media interface 72.

The I/O interface 66 preferably has a q-threshold input 74, a q-size input 76 and optionally has an acknowledgement buffer size input 78. It also has an acknowledgement rate control signal output 80 and optionally has an acknowledgement removal signal output 82.

The q-threshold input 74 may be in communication with a processor (not shown) of the network element 14, to receive a value representing a q-threshold level (T) therefrom. The q-size input 76 is in communication with the forward data queue buffer 40 shown in FIG. 2, and is operable to receive values representing the input and output pointers of the forward data queue buffer 40. The acknowledgement buffer size input 78 is operable to receive values representing the input and output pointers of the acknowledgement signal queue 46. The acknowledgement rate control signal output 80 is in communication with the acknowledgement signal transmitter 48 and provides acknowledgement rate control signals representing tokens for controlling the acknowledgement signal transmitter 48 to cause it to transmit an acknowledgement signal from the acknowledgement signal queue 46 through the multiplexer 50 to the transmitter 12. The acknowledgement removal signal output 82 is operable to provide an acknowledgement removal signal to the acknowledgement signal queue 46 to facilitate removal of acknowledgement packets therefrom.

The program memory 68 is preferably loaded with blocks of program instructions for directing the processor 62 to accomplish various functions used in carrying out the method according to this embodiment of the invention. Such blocks of program instructions may be provided to the program memory 68 by causing the processor to read such instructions from a memory medium such as a CD-ROM, floppy diskette or other processor readable medium in communication with the media interface 72. The media interface may include a floppy disk drive for this purpose, for example. Alternatively, the instructions may be provided in a signal embodied in a carrier wave received at the communications interface 70, for example, the signal having various segments for providing various functional blocks of instructions.

In this embodiment, the program memory 68 is loaded with program instructions including a q monitor block 84, an ack rate signal generator block 86 and an optional ack redundancy controller block 88.

Q Monitor

Figure 4:
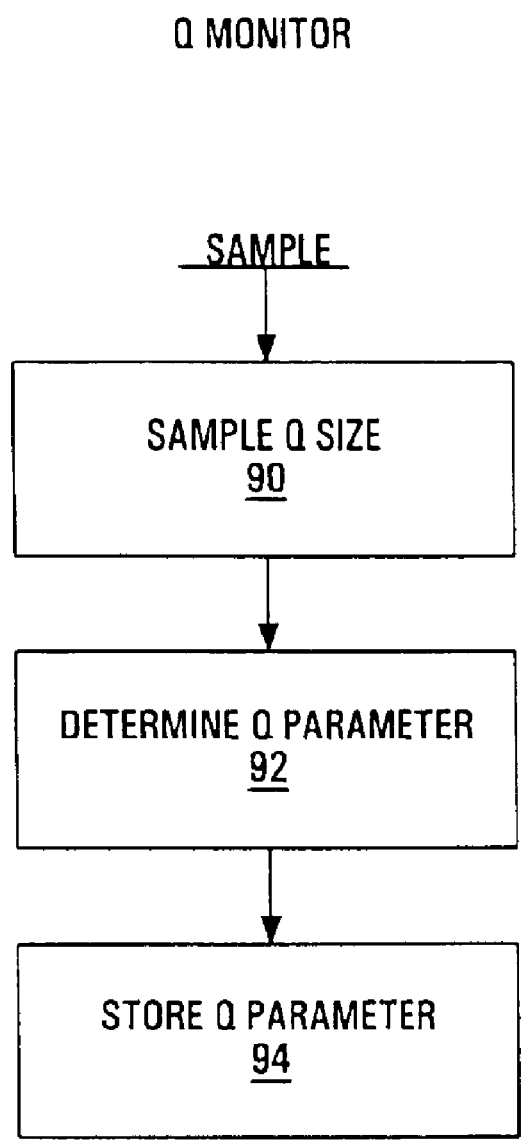
FIG. 4 is a queue monitor routine implemented by a block of instructions stored in the apparatus shown in FIG. 3.

The q monitor block 84 directs the processor circuit 60 to measure the queue size, and produce a signal indicative of queue occupancy. Referring to FIG. 4, to do this, in this embodiment, the q monitor block 84 includes a block of instructions 90 which directs the processor circuit 60 to act as a sampler for sampling the forward data queue buffer 40 to determine values for the input and output address pointers of the forward data queue buffer 40. Block 92 then directs the processor to determine a queue parameter, which may include a measure of the actual queue occupancy or a measure of the rate at which the queue occupancy is changing, the queue parameter being derived from the input and output address pointers of the forward data queue. Actual queue occupancy is determined by taking the difference between the input and output address pointers of the queue buffer 40. The difference represents the number of packets in the queue, that is, the measured queue occupancy.

Block 94 directs the processor to store the queue parameter for later use.

Ack Rate Signal Generator

The ack rate signal generator block 86 includes blocks of instructions which direct the processor to implement a rate determiner 96, an ack schedule monitor 98 and an optional q-threshold smoother 100. The rate determiner is shown generally at 96 in FIG. 5.

Figure 5:
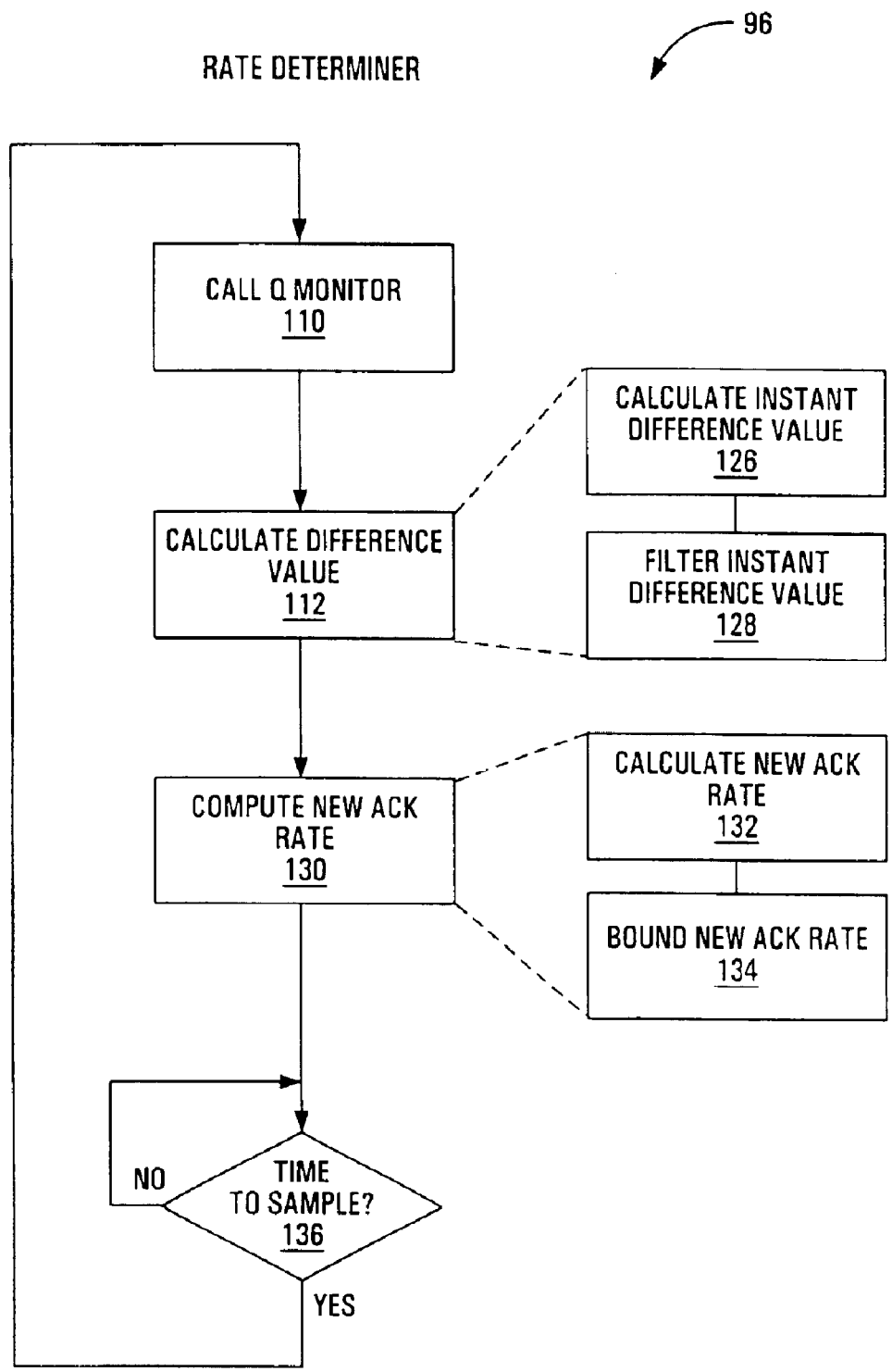
FIG. 5 is a flowchart of a rate determiner routine implemented by a block of instructions stored in the apparatus shown in FIG. 3.

Referring to FIG. 5, the rate determiner 96 begins with a first block 110 which directs the processor to call the q monitor block 84, shown in FIG. 4, to acquire a new value for the queue parameter. Having obtained this new value, block 112 directs the processor to determine a difference value representing the difference between a target queue occupancy value and the measured queue occupancy value.

Figure 6:
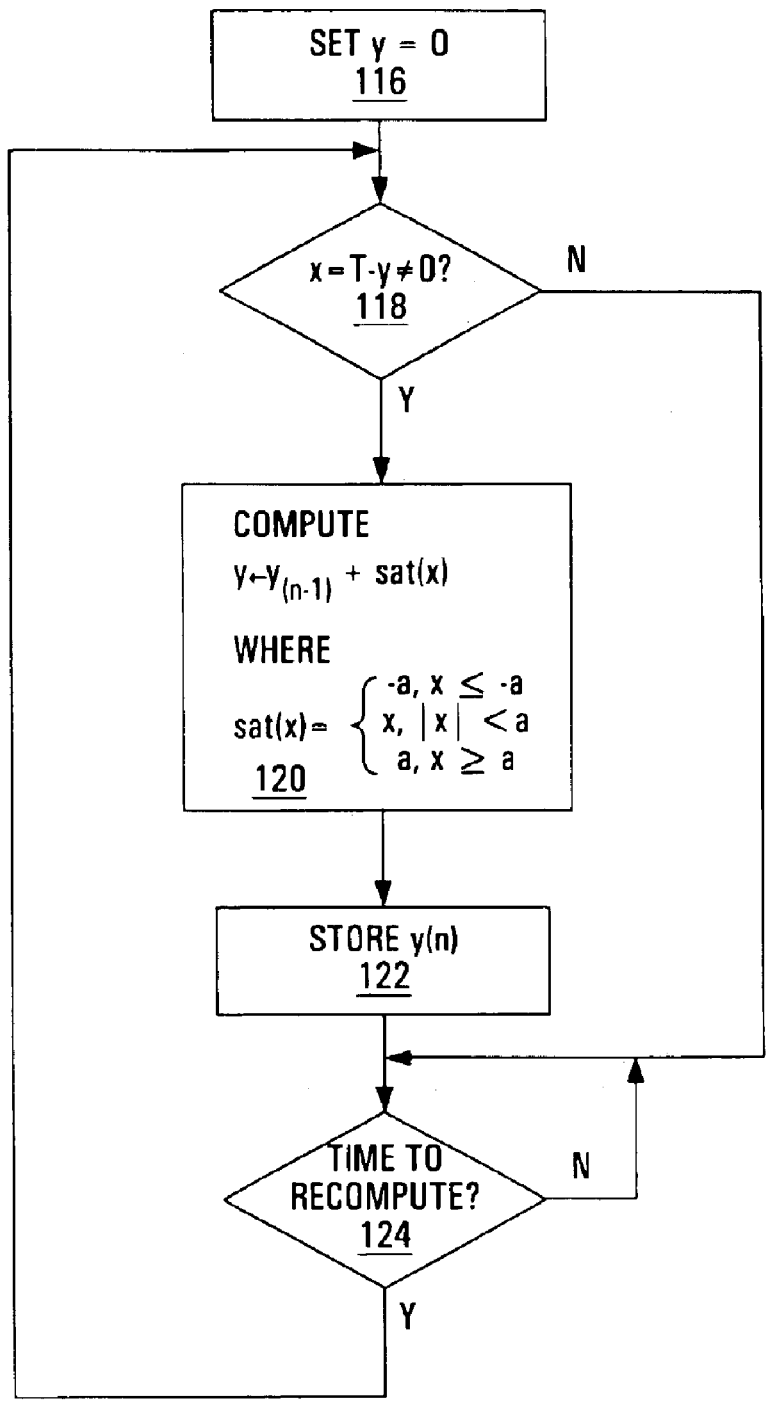
FIG. 6 is a flowchart of a threshold smoother routine implemented by a block of instructions stored in the apparatus shown in FIG. 3.

The target queue occupancy value used in determining this difference is a stored value derived from the q-threshold input 74 of the I/O interface 66 shown in FIG. 3. Recall that the value received at the q-threshold input 74 may be provided by the processor of the network element and thus may vary in time because of system operation needs. To prevent acknowledgement token signals from being produced at an erratic rate, the value received at the q-threshold input 74 may be filtered by a threshold smoothing routine as shown at 114 in FIG. 6. Referring to FIG. 6, the threshold smoothing routine 114 essentially limits the rate of change of the threshold value T received at the q-threshold input 74. Thus the routine directs the processor to act as a ramp unit or rate limiter. Effectively, when the threshold value T is within a certain range $-a \leq T \leq a$ the threshold smoother directs the processor to provide a value y which follows the value at the q-threshold input 74. An integrator action in the routine effectively causes the output value y to be identical to the input value T in the steady state. However, the integrator action is applied to an amplitude limited input signal T, hence the rate of change of the output y will be limited to the bounds imposed on the input value T. Hence the smoothing action of the threshold smoother may be described by the following equations:

$$\frac{dy}{dt} = sat(x) = sat(T - y)$$

in continuous-time domain and $$\left. \begin{array}{l} \Delta y(n) = y(n) - y(n-1) = sat(T - y(n-1)) \\ y(n) = y(n-1) + sat(T - y(n-1)) \end{array} \right\}$$

in discrete-time domain.

The amplitude limiter or saturation sat(e) is defined as $$sat(e) = \begin{cases} -a, & x \leq -a \\ x, & |x| < a \\ a, & x \geq a \end{cases}$$

where the limit a is a ramping step size and can be defined as a small fraction of a threshold step size $\Delta T$, i.e., $\alpha = g \cdot \Delta T$, $0 < g < 1$, if $\Delta T$ is large enough to require a smoothing of T.

Smoothing may not be required for small $\Delta T$. In FIG. 6, y is the smoothed threshold input to the computations of the new acknowledgement rate.

In this embodiment, the smoothing of the value T is implemented in discrete time steps by the routine shown at 114 in FIG. 6, which begins with a first block 116 which initializes the value y to 0. Block 118 then directs the processor to determine whether the following expression is non-zero:

$$x = T - y$$

If so, then block 120 directs the processor to determine a value for y according to the relation:

$$y \leftarrow y + sat(x)$$

where:

$$sat(e) = \begin{cases} -a, & x \leq -a \\ x, & |x| < a \\ a, & x \geq a \end{cases}$$

Block 122 then directs the processor to store the value y for later use in calculations and then block 124 directs the processor to determine whether or not it is time to recompute. If so, then the process is repeated beginning at block 118. Otherwise, the processor waits until it is time to recompute.

If at block 118, the value x is equal to zero, there is no need to recalculate a value for y and the processor is directed to block 124 to wait for the next time to recompute.

Preferably, the processor 62 shown in FIG. 3 is fast enough to ensure that the time interval between each computation of a y value is smaller than the time interval between any changes to the threshold value T.

Referring back to FIG. 5, block 126 directs the processor to calculate an instantaneous difference value according to the relation:

$$e(n) = T(n) - q(n) \text{ (in units of 64 bytes)}$$

where:

e(n) is the instantaneous difference value at time n.

T(n) is a target queue occupancy value at time n or a smoothed target queue occupancy value y(n), if smoothing is applied.

q(n) is the queue parameter value at time n.

Block 128 then directs the processor to filter the instantaneous difference value with a low pass filter routine. Low pass filtering is desirable because network traffic can be very bursty, hence the measured queue occupancy can also be bursty, resulting in a bursty instantaneous difference value.

In this embodiment the low pass filter routine effectively provides a discrete-time first-order low-pass filter with gain $0<\beta<1$. The value $\beta$ controls the reaction speed of the filter. As $\beta$ decreases the $\hat{e}$ curve becomes smoother. The value $\beta$ should be selected small enough to eliminate the noisy fluctuations, and large enough to discover the changes in traffic dynamics. A suggested value is $\beta=0.002$.

The filtered difference value is given by $$\hat{e}(n)=(1-\beta)\hat{e}(n-1)+\beta e(n).$$

The filtered difference value appears as an exponentially weighted moving average (EWMA) of the error signal and can be expressed as $$\hat{e}(n) = (1-\beta)^n \hat{e}(0) + \beta \sum_{i=0}^{n-1} (1-\beta)^i e(n-i)$$

$$= \beta \sum_{i=0}^{n-1} (1-\beta)^i e(n-i), \text{ if } \hat{e}(0)=0$$

Still referring to FIG. 5, after the filtered difference value has been calculated, block 130 directs the processor to compute a new acknowledgment rate value. In this embodiment, this may be done by a first block 132 which directs the processor to calculate a new rate value and block 134 which directs the processor to bound the new rate value between predefined limits.

Effectively, these blocks direct the processor to incrementally change the acknowledgement pacing rate r in proportion to the filtered error signal. These blocks implement a simple recursive or integral control scheme by calculating a new rate value r(n) according to the relation:

$$r(n)=r(n-1)+\alpha\hat{e}(n) \text{ (in ACKs/sec)}$$

where $\alpha$ is a control gain.

Effectively the value $\alpha$ controls the reaction and stability of the control system implemented by the apparatus 38 and the transmitter 12. As the gain value $\alpha$ increases, the stronger the change in the acknowledgement pacing rate r to a variation in $\hat{e}$. The gain value $\alpha$ must be large enough to cause a change in the acknowledgement pacing rate to a change in $\hat{e}$, but not too large to avoid the emergence of undesired oscillations.

The basic recursion $r(n)=r(n-1)+\alpha e(n)$ implements a standard integral or summation control scheme since $\Delta r(n)=r(n)-r(n-1)=\alpha e(n)$ or $$r(n) = \alpha \sum_{i=0}^{n} e(i),$$

in discrete time (and $dr(t)/dt=\alpha e(t)$ or $$r(t) = \alpha \int_0^t e(\tau) d\tau,$$

in continuous-time).

The bounding of the new ack rate as provided by block 134 places minimum and maximum limits on the value r(n) according to the relation:

$$r(n) = [r(n-1) + \alpha\hat{e}(n)]_{r_{min}}^{r_{max}} \text{ (in ACKs/sec)}$$

where $r_{min}$ and $r_{max}$ are, respectively, lower and upper bounds on r.

The upper bound $r_{max}$ can be set equal to a forward data buffer service rate C(n) (i.e., the allocated capacity), and $r_{min}$ to C(n)/3, for example, or any suitable value $r_{min}>0$.

The limits must be selected carefully, however, too hard a limitation will impose an unnecessary limitation on the control action, and too weak a limitation will cause windup of the rate value, due to the integrator action in the method of calculation. A suitable initial value for r(0) may be C(n)/2, for example.

For network traffic control with a wide range of operating conditions, it may happen that there is a persistent control error (or mismatch) between the control target value T and the measured queue occupancy q. This persistent error may be due to rate constraints at certain network nodes. For example, the errors may be due to rate constrained traffic source(s), rate constraints due to downstream bottlenecks, or rate reduction due to upstream and/or downstream packet losses. Bounding the rate value reduces the effects of these uncontrollable sources of error.

Still referring to FIG. 5, after producing a new rate value, block 136 directs the processor to determine whether or not it is time to resample the queue pointers and if so, directs the processor back to block 110. If not, the processor waits until it is time to resample.

Thus, the rate determiner directs the processor to use information from the queue to determine a rate at which acknowledgement packets are to be transmitted to the transmitter 12.

Acknowledgement Schedule Monitor

Figure 7:
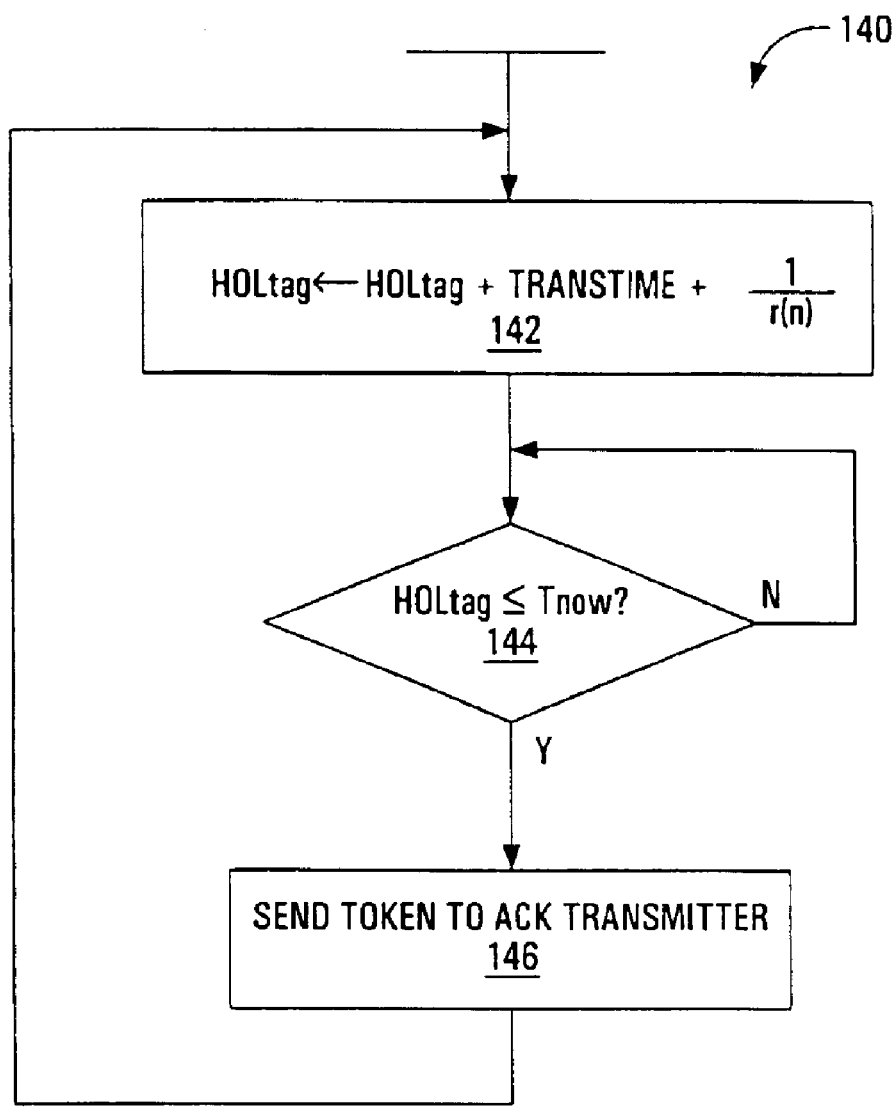
FIG. 7 is a flowchart of an acknowledgement schedule monitor routine implemented by instructions stored in the apparatus shown in FIG. 3.

Concurrently running with the rate determiner is the acknowledgement schedule monitor shown at 140 in FIG. 7, which directs the processor to use the current rate value r to produce a new departure time value representing a next departure time at which an acknowledgement packet is to be transmitted by the acknowledgement signal transmitter 48 shown in FIG. 2. To do this, the ACK schedule monitor 140 maintains a head-of-line (HOL) tag, HOLTag. This tag (or timestamp) represents the next time at which the ACK transmitter should send an acknowledgement packet to the TCP transmitter 12. Block 142 produces a HOLTag value according to the relation:

$$HOLTag \leftarrow HOLTag + TransTime + \frac{1}{r(n)}, \text{ (in seconds)}$$

Where:
TransTime is the time taken to transmit the last ACK packet (TransTime=0 if there is no waiting ACK packet); and
r(n) is the currently calculated rate value produced by the rate determiner shown in FIG. 5.

The value HOLTag is initialized to a current time value on receiving a first ACK packet in the acknowledgement signal queue 46. The current time value may be provided by a realtime clock running at the processor, for example. The HOLTag value is updated even in the absence of waiting ACK packets in the acknowledgement signal queue.

Block 144 directs the processor to determine whether a current time value TNow is greater than or equal to the current HOLTag value and if so block 146 directs the processor to send an acknowledgement token signal to the acknowledgement signal transmitter 48 shown in FIG. 2, to cause the acknowledgement signal transmitter 48 to transmit an acknowledgement packet from the acknowledgement signal queue 46 to the transmitter 12. The processor then is directed back to block 142 to calculate a new HOLTag value.

If the current time value TNow is not greater than or equal to the current HOLTag value the processor waits until it is.

Figure 8:
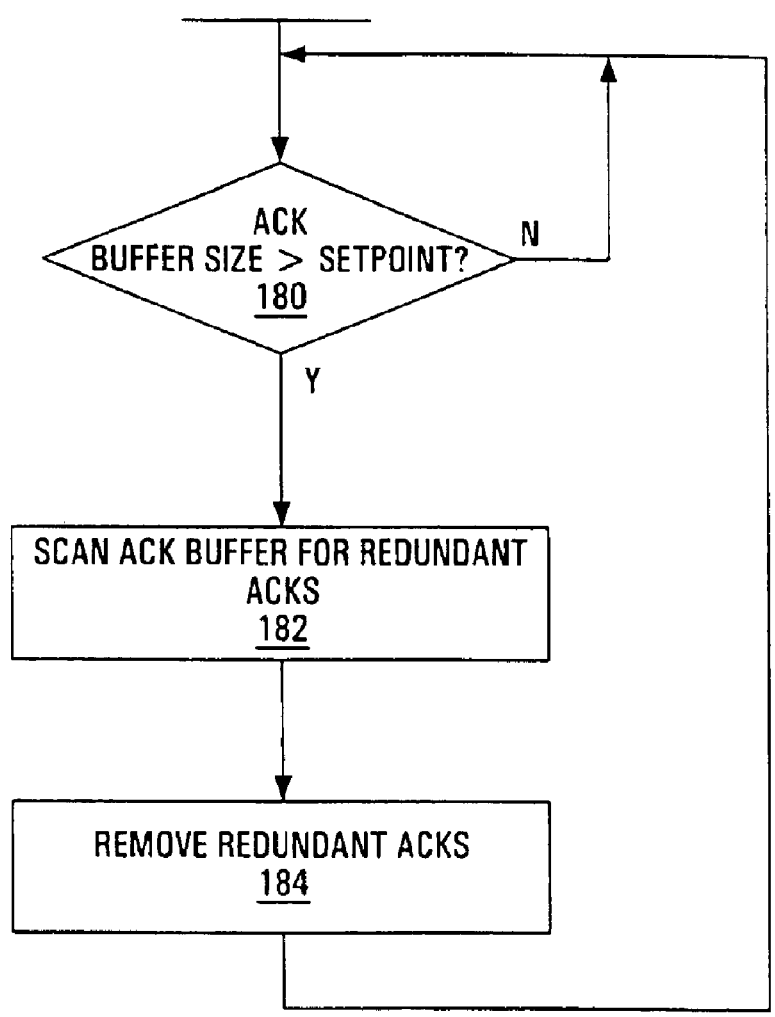
FIG. 8 is a flowchart of an acknowledgement redundancy controller routine implemented by a block of codes stored in the apparatus shown in FIG. 3.

To control the number of ACK packets queued in the ACK buffer on the reverse link (if needed), an ACK filtering mechanism can be used. This is provided by the optional ack redundancy controller block 88 shown in FIG. 3. Use of the ack redundancy controller block 88 is just a pre-cautionary measure to prevent the acknowledgement signal queue 46 from overflowing if ever the acknowledgement rate r gets too low. Use of the ACK redundancy controller exploits the cumulative nature of TCP acknowledgement packets to filter redundant acknowledgement packets from the queue when a new acknowledgement packet arrives for the same connection. Effectively some or all of the "earlier" acknowledgement packets are removed from the queue and discarded. To do this, referring to FIG. 8, the ack redundancy controller begins with block 180 which directs the processor to determine whether or not the number of acknowledgement packets in the acknowledgement signal queue 46 is greater than a predefined number. The number of packets in the acknowledgement signal queue 46 is found by reading the acknowledgement buffer size input 78 of the I/O interface 66 shown in FIG. 3 and the signal received at this input may be generated by the processor (not shown) of the network element.

Next, blocks 182 and 184 direct the processor to send signals from the acknowledgement removal signal output 82 to the network element processor to cause it to scan the acknowledgement signal queue 46 for redundant acknowledgement packets and to remove such packets therefrom. Since the transmitter 12 increments its congestion window based on the number of acknowledgement packets received and not on how many bytes are acknowledged with each acknowledgement packet, congestion window growth at the transmitter could be much slower. Thus, when a new acknowledgement packet is received at the acknowledgement signal queue 46 and there is a danger of overflow as indicated by signals received at the acknowledgement buffer size input 78, a number of the acknowledgement packets belonging to the same connection can be removed by directing the processor to produce signals at the acknowledgement removal signal output 82 of the I/O interface 66 to cause the network element processor to remove such acknowledgement packets.

In addition, ACK-first scheduling can also be employed in the reverse link to give acknowledgement packets strictly higher priority than data packets since the smaller acknowledgement packets, when sent infrequently, will have little impact on the performance of the reverse data transfer, but their timely transmission is desired to sustain good performance for forward data transfer.

In control system terms, referring to FIG. 2, in this embodiment the apparatus 38 effectively samples and determines a measured queue size q every $\Delta t$ units of time, and provides a new ACK pacing rate r every $\Delta t$ units of time. Thus, $\Delta t$ is the sampling/control interval for the system and represents the time interval required for taking measurements and making computations.

In the method described herein, since the objective is to control the queue size to be close to T, a sampling rate that allows overflows (i.e., queue sizes much greater than T) and underflows (i.e., queue sizes much lower than T) to be observed is more appropriate. Thus, a sampling interval that permits accumulation of a number of packets not greater than T is reasonable. To ease implementations at high-speeds and reduce processing overhead, $\Delta t$ can be higher, e.g., $\Delta t=10$ packets or any suitable value.

The value T received at the q-threshold input 74 denotes the target queue occupancy (or threshold). This value sets the buffer utilization level and average queuing delay, since the queue evolves around this value. There is flexibility in the selection of T. Typically, T could be one-half of the buffer capacity B, i.e., $T=B/2$. T can even be varied from time to time, if required, such as where a user desires to change operating conditions such as user delays, packet loss rates, etc. The value T is, as a result, typically piece-wise constant with changes occurring less frequently.

Effectively, the goal of the controller is to adapt r so that the magnitude of the error signal $$e(n)=T-q(n) \text{ (in units of 64 bytes)}$$

is kept to a minimum. To simplify system implementation and dimensioning, T and q(n) can be specified in any units (e.g., bytes) and e(n) measured in units of 64 bytes. Note that a typical ACK packet is 64 bytes long.

The ACK pacing method and apparatus described above can be extended to handle per-class or flow queuing scenarios. Merely using a fair queuing scheduler, without appropriate queue management, does not necessarily lead to improved performance. This is because per-class (or per-flow) scheduling algorithms by themselves do nothing to control the overall queue size of individual queues. Per-flow scheduling can allocate bandwidth fairly among backlogged connections and can provide low queuing delays. However, for TCP packets, fair bandwidth allocation does not necessarily result in fair bandwidth usage. Some form of active queue management is needed to control the overall queue sizes, so that arriving bursts of packets can be accommodated without dropping packets. The method described above can be adapted to control the queue sizes for each individual flow or class, so that they do not experience unnecessarily high delays.

Also, to accommodate non-responsive or ill-behaved traffic such as User Datagram Protocol (UDP) traffic in the method and apparatus described herein, TCP traffic can be isolated from UDP traffic. UDP and TCP traffic flows can each be queued in a number of (per-class) queues which can be served according to a number of queuing disciplines (e.g., weighted round-robin, weighted fair queuing, etc.). The rates of UDP flows can be shaped using a leaky-bucket or similar scheme. The criteria for classifying the input traffic flows can be based on source/destination IP addresses, TCP and UDP port numbers, the Type of Service (TOS) field (or DS field), and any higher level IP packet attributes.

Figure 9:
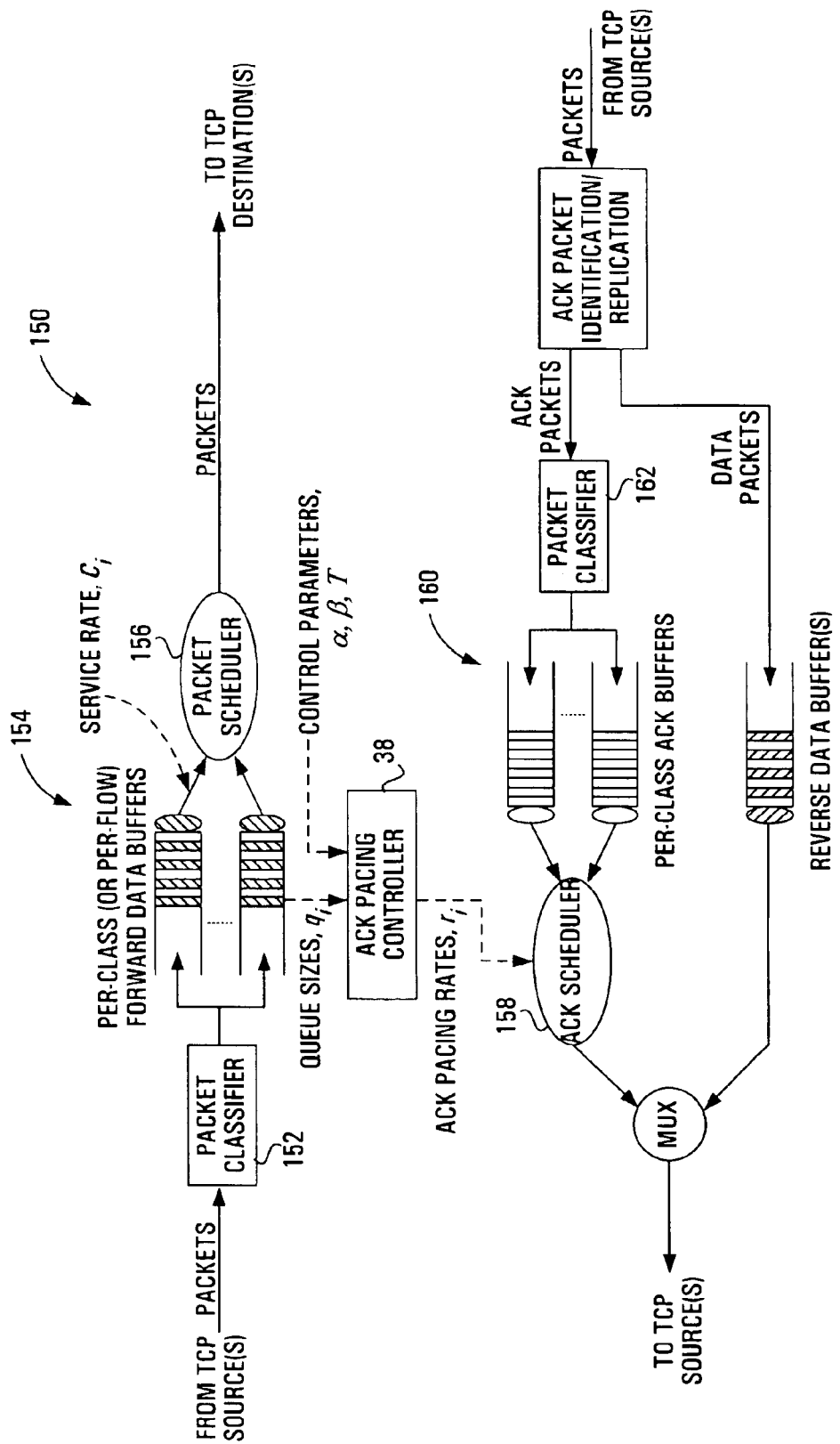
FIG. 9 is a schematic representation of a multiple class network element according to a second embodiment of the invention.

Referring to FIG. 9, a system according to a second embodiment of the invention is shown generally at 150 in which an ack pacing apparatus 38 as described in connection with the first embodiment of the invention is used in conjunction with a network element having a packet classifier 152, a plurality of forward data queue buffers 154 and a packet scheduler 156 in the forward direction and an acknowledgement scheduler 158 a plurality of acknowledgement buffers 160 and a packet classifier 162 in the reverse direction.

The packet classifier 152 applies a policy for mapping incoming traffic into different traffic classes. A wide range of traffic classes can be supported depending on the implementation complexity desired. The packet classifier 152 in the forward direction maps traffic into per-class forward data queue buffers 154 and the packet classifier 162 in the reverse direction maps ACK packets to their corresponding reverse acknowledgement buffers 160.

The forward packet scheduler 156 applies a policy for discriminating how traffic associated with different traffic classes is managed and scheduled for transmission to the receiver 16. The acknowledgement scheduler 158 in the reverse direction schedules each ACK queue according to its allowed ACK pacing rate, as determined by the ACK pacing apparatus 38.

Each queuing class may be controlled by a separate ACK pacing apparatus 38, or a single unit capable of performing individual calculations for each rate to be calculated.

In the case where a single controller is used, the ACK pacing apparatus 38 maintains a timestamp for each ACK buffer of the plurality of acknowledgement buffers 160. Each buffer has an associated HOL tag HOLTag, for each class i=1,2, . . . ,K computed from the per-class token generation rate $r_i(n)$. The lower bound $r_{min,i}$ and upper bound $r_{max,i}$ on each ACK pacing rate $r_i(n)$, must be set based on the allocated bandwidth of each queue i, e.g., $r_{max,i}=C_i(n)$, where $C_i(n)$ is the allocated bandwidth of queue i at time n. The HOLTag represents the next time at which an ACK packet should be taken from the associated queue and transmitted to the transmitter 12.

The ACK pacing apparatus 38 continually monitors the values of the HOLTags. Whenever the current time TNow becomes greater than or equal to $HOLTag_i$, the corresponding ACK packet from class i is scheduled for transmission. The eligible ACK packet is transmitted and the $HOLTag_i$ is updated according to the relation:

$$HOLTag_i \leftarrow HOLTag_i + TransTime + \frac{1}{r_i(n)} \text{ (in seconds)}$$

When conflicts occur in the per-class scheduling times (i.e., when two or more classes are eligible for transmission at the same time instant, or in other words when two or more classes have the same HOLTag value), the conflicting classes are served in a round-robin fashion with their associated HOLTags updated as follows:

$$HOLTag_i \leftarrow TActual_i + \frac{1}{r_i(n)} \text{ (in seconds)}$$

where $TActual_i$ is the actual time that class i is scheduled for transmission.

In summary, the ACK pacing scheme described herein causes ACK packets to be transmitted to the transmitter 12 in response to network load dynamics. The method described herein achieves this without having to know explicitly when a TCP source is in slow-start or congestion avoidance modes, which is desirable since the desired spacing between ACKs is likely to be different in the two modes, for example. The method described herein permits a network element to actively reduce congestion (in any packet queue) by controlling the rate at which end systems communicate. As the network element tends toward congestion, the packet flows are rate shaped by slowing down the return of ACK packets so that the end-to-end communication slows down towards the allocated rate.

While specific embodiments of the invention have been described and illustrated, such embodiments should be considered illustrative of the invention only and not as limiting the invention as construed in accordance with the accompanying claims.

What is claimed is:

1. A method of controlling a rate at which data packets are transmitted from a source responsive to acknowledgement signals in a packet network, the method comprising adjusting an acknowledgement rate at which acknowledgement signals are sent to said source, in response to a difference between a target queue occupancy and a measured queue occupancy of a queue buffer in which data packets from said source are received.

2. The method of claim 1 further comprising adjusting said acknowledgement rate such that the difference between said target queue occupancy and said measured queue occupancy is minimized.

3. The method of claim 2 further comprising producing a difference value representing said difference between said target queue occupancy and said measured queue occupancy.

4. The method of claim 3 further comprising filtering successively produced difference values to produce said difference value.

5. The method of claim 4 wherein filtering comprises producing said difference value as an exponentially weighted moving average of said successively produced difference values.

6. The method of claim 3 further comprising transmitting acknowledgement signals at a rate determined as a function of a present rate and said difference value.

7. The method of claim 6 further comprising producing a rate value representing a rate at which said acknowledgement signals are to be transmitted to said source, said rate value being produced according to the following relation:

$$r(n)=r(n-1)+\alpha e(n)$$

where:
r(n) is the rate value at time interval n;
r(n−1) is a rate value immediately preceding the rate value at time interval n;
α is a control gain value; and
e(n) is said difference value representing said difference between said target queue occupancy and said measured queue occupancy.

8. The method of claim 1 further comprising imposing bounds on said acknowledgement rate.

9. A computer readable medium for providing instructions for directing a processor to carry out a method of controlling a rate at which data packets are transmitted from a source responsive to acknowledgement signals in a packet network, the instructions being operable to direct a processor to adjust an acknowledgement rate at which acknowledgement signals are sent to said source, in response to a difference between a target queue occupancy and a measured queue occupancy of a queue buffer in which data packets from said source are received.

10. A computer-readable signal encoded with codes for directing a processor to adjust an acknowledgement rate at which acknowledgement signals are sent to a source, in response to a difference between a target queue occupancy and a measured queue occupancy of a queue buffer in which data packets from said source are received.

11. An apparatus for controlling a rate at which data packets are transmitted from a source responsive to acknowledgement signals in a packet network, the apparatus comprising:

a) means for detecting queue occupancy of a queue buffer in which data packets from said source are received; and b) means for adjusting an acknowledgement rate at which acknowledgement signals are sent to said source, in response to a difference between a target queue occupancy and a measured queue occupancy of said queue buffer.

12. An apparatus for controlling a rate at which data packets are transmitted from a source responsive to acknowledgement signals in a packet network, the apparatus comprising:

a) a queue monitor for producing signals indicative of queue conditions of a queue buffer in which data packets from said source are received; and b) an acknowledgement rate signal generator for generating a rate signal in response to a difference between a target queue occupancy and a measured queue occupancy of said queue buffer in which data packets from said source are received, for adjusting an acknowledgement rate at which acknowledgement signals are sent to said source.

13. The apparatus of claim 12 wherein said queue monitor is operable to produce a signal indicative of said measured queue occupancy.

14. The apparatus of claim 13 wherein said acknowledgement rate signal generator comprises a processor for generating said rate signal in response to said difference between said target queue occupancy and said measured queue occupancy.

15. The apparatus of claim 14 wherein said processor is programmed to adjust said acknowledgement rate such that said difference between said target queue occupancy and said measured queue occupancy is minimized.

16. The apparatus of claim 15 wherein said processor is programmed to produce a difference value representing said difference between said target queue occupancy and said measured queue occupancy.

17. The apparatus of claim 16 further comprising a filter for filtering a plurality of said difference values to produce a filtered difference value.

18. The apparatus of claim 17 wherein said filter comprises said processor and said processor is programmed to produce said difference value as an exponentially weighted moving average of successively produced difference values.

19. The apparatus of claim 16 wherein said processor is programmed to produce said rate signal as a function of a present rate and said difference value.

20. The apparatus of claim 19 wherein said processor is programmed to produce said rate signal to represent a rate value produced according to the following relation:

$$r(n)=r(n-1)+\alpha e(n)$$

where:

r(n) is a rate value at time instant n;

r(n−1) is a rate value immediately preceding the rate value at time instant n;

α is a control gain value; and e(n) is said difference value representing said difference between said target queue occupancy and said measured queue occupancy.

21. The apparatus of claim 12 wherein said acknowledgement rate signal generator is programmed to impose bounds on said acknowledgement rate.

* * * * *